(12) United States Patent
Sie et al.

(10) Patent No.: US 8,370,625 B2
(45) Date of Patent: Feb. 5, 2013

(54) EXTENDED DATA SIGNING

(75) Inventors: Yu Lin Sie, Bellevue, WA (US);
Kedarnath A Dubhashi, Redmond, WA (US); Anand D Paka, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 12/137,513

(22) Filed: Jun. 11, 2008

(65) Prior Publication Data
US 2009/0310789 A1 Dec. 17, 2009

(51) Int. Cl.
*H04L 29/06* (2006.01)
(52) U.S. Cl. ........................................ 713/156
(58) Field of Classification Search ............... 713/156
See application file for complete search history.

(56) References Cited

U.S. PATENT DOCUMENTS

| | | | |
|---|---|---|---|
| 6,219,423 B1 * | 4/2001 | Davis | 380/268 |
| 6,539,093 B1 | 3/2003 | Asad et al. | |
| 6,854,056 B1 | 2/2005 | Benantar et al. | |
| 6,898,707 B1 | 5/2005 | Sit et al. | |
| 7,069,440 B2 | 6/2006 | Aull | |
| 7,225,337 B2 | 5/2007 | Baessler | |
| 2002/0116610 A1 | 8/2002 | Holmes et al. | |
| 2003/0126432 A1 | 7/2003 | Tonisson | |
| 2006/0294366 A1* | 12/2006 | Nadalin et al. | 713/156 |

FOREIGN PATENT DOCUMENTS

| | | |
|---|---|---|
| EP | 0869637 A3 | 10/1998 |
| WO | WO2006006124 A1 | 1/2006 |

OTHER PUBLICATIONS

"Understanding Digital Certificates", retrieved at <<http://publib.boulder.ibm.com/iseries/v5r1/ic2924/index.htm?info/rzahu/rzahurzahu4abunderstanddc.htm>>, pp. 3.
Gladman, et al., "Digital Signatures, Certificates and Electronic Commerce", Version 1.1, Jun. 1999, pp. 19.

\* cited by examiner

*Primary Examiner* — Kambiz Zand
*Assistant Examiner* — Stephen Sanders
(74) *Attorney, Agent, or Firm* — Wolfe-SMBC

(57) ABSTRACT

Various embodiments enable so-called extended data to be added to a signed digital certificate without having a private key of a Certification Authority available. In at least some embodiments, a digital certificate can be issued and signed off line by the Certification Authority, and then later extended data can be added and signed using another key, whose public key was earlier embedded and signed in the certificate.

20 Claims, 4 Drawing Sheets

EXTENDED DATA SIGNING

BACKGROUND

Public-key infrastructure or "PKI" refers to a system that is utilized to provide public-key encryption and digital signature services. The purpose of PKI is to manage keys and certificates. By managing keys and certificates through a PKI, an organization can establish and maintain a trustworthy networking environment. PKIs can enable the use of encryption and digital signature services across a wide variety of applications.

PKIs can be used to ensure that user identities and keys are valid and trustworthy. To provide this assurance, all users of a PKI have a registered identity. These identities are stored in a digital format known as a public-key certificate. Certification Authorities (CAs) act as agents of trust in a PKI. As long as a CA is trusted, users can trust certificates issued by the CA. Certification Authorities create certificates for users or clients by digitally signing, with a CA private key, a set of data that can include the following information, as well as other information: an ID such as a client's hardware ID, a public key associated with the user or client, a validity period of the certificate, and/or specific operations for which the public key is to be used.

The Certification Authority's signature on a certificate allows any tampering with the contents of the certificate to be easily detected. As long as the Certification Authority's signature on a certificate can be verified, the certificate has integrity. Since the integrity of the certificate can be determined by verifying the Certification Authority's signature, certificates are inherently secure and can be distributed in a completely public manner.

In many systems, servers distribute certificates including the ID, public key, and signature. The certificate can, in some instances, be generated at run time responsive to a client request. Typically, a client will formulate a request and include, in the request, an ID that it wishes to be placed into the certificate. The certificate can then be generated, in at least some instances, by what is known as an individualization server.

One of the issues associated with servers issuing certificates, such as individualization servers, is that the servers are front-end servers that are operated by entities that are different from entities associated with digital rights management (DRM) entities that protect content that can be obtained and consumed using the issued certificates. If the individualization server's private key is compromised, as by being leaked by personnel associated with the individualization server, then certificates can be issued by malicious entities, thus compromising the integrity of the system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable so-called extended data to be added to a signed digital certificate without having a private key of a Certification Authority available. In at least some embodiments, a digital certificate can be issued and signed off line by the Certification Authority, and then later extended data can be added and signed using another key, whose public key was earlier embedded and signed in the certificate.

In accordance with one or more embodiments, a certificate is generated off line and includes reserved spaces which can be added to the end of the certificate. The reserved spaces can be used for including extended data. The reserved spaces are not signed by a Certification Authority's private key. Rather, another key pair, referred to as an "extended data signing key pair", is generated for this purpose. The extended data signing key pair includes a public and a private key. The public key of the extended data signing key pair is embedded into the certificate when it is generated off line. During run time, a server such as an individualization server can add a client's ID to the reserved spaces of the certificate, and then sign the extended data with the corresponding private key of the extended data signing key pair. The extended data which, in at least some instances can include a client's ID, can be verified by the embedded extended data signing public key in the certificate.

In this manner, the certificate can be generated in two phases-a first phase can generate certificate portions prior to run time, and a second phase can generate other certificate portions at run time. The generated certificate can be cryptographically verified as with a normal digital certificate.

BRIEF DESCRIPTION OF THE DRAWINGS

The same numbers are used throughout the drawings to reference like features.

DETAILED DESCRIPTION

Overview

In at least some embodiments, two different keys can be utilized to assert information in a digital certificate. For example, a Certification Authority's key can assert first portions of the certificate, and another key can be used to assert other information in an extended portion of the certificate.

Various embodiments enable so-called extended data to be added to a signed digital certificate without having a private key of a Certification Authority available. In at least some embodiments, a digital certificate can be issued and signed off line by the Certification Authority, and then later extended data can be added and signed using another key, whose public key was earlier embedded and signed in the certificate.

In accordance with one or more embodiments, a certificate is generated off line and includes reserved spaces which can be added to the end of the certificate. The reserved spaces can be used for including extended data. The reserved spaces are not signed by a Certification Authority's private key. Rather, another key pair, referred to as an "extended data signing key pair", is generated for this purpose. The extended data signing key pair includes a public and a private key. The public key of the extended data signing key pair is embedded into the certificate when it is generated off line. During run time, a server such as an individualization server can add a client's ID to the reserved spaces of the certificate, and then sign the extended data with the corresponding private key of the extended data signing key pair. The extended data which, in at least some instances can include a client's ID, can be verified by the embedded extended data signing public key in the certificate. In at least some embodiments, the extended data can be verified by ensuring that the signature on the extended data is by the extended data signing public key in the certificate.

In this manner, the certificate can be generated in two phases-a first phase can generate certificate portions prior to run time, and a second phase can generate other certificate portions at run time. The generated certificate can be cryptographically verified as with a normal digital certificate.

In the discussion that follows, a section entitled "Operating Environment" describes but one operating environment that can be utilized to practice the inventive principles described herein in accordance with one or more embodiments. Following this, a section entitled "Using Different Keys to Assert Information in a Digital Certificate" is provided and describes how different keys can be used to assert information in a digital certificate. Following this, a section entitled "Example Method" describes an example method in accordance with one or more embodiments. Last, a section entitled "Example System" describes an example system that can be utilized to implement one or more embodiments.

Operating Environment

Figure 1:
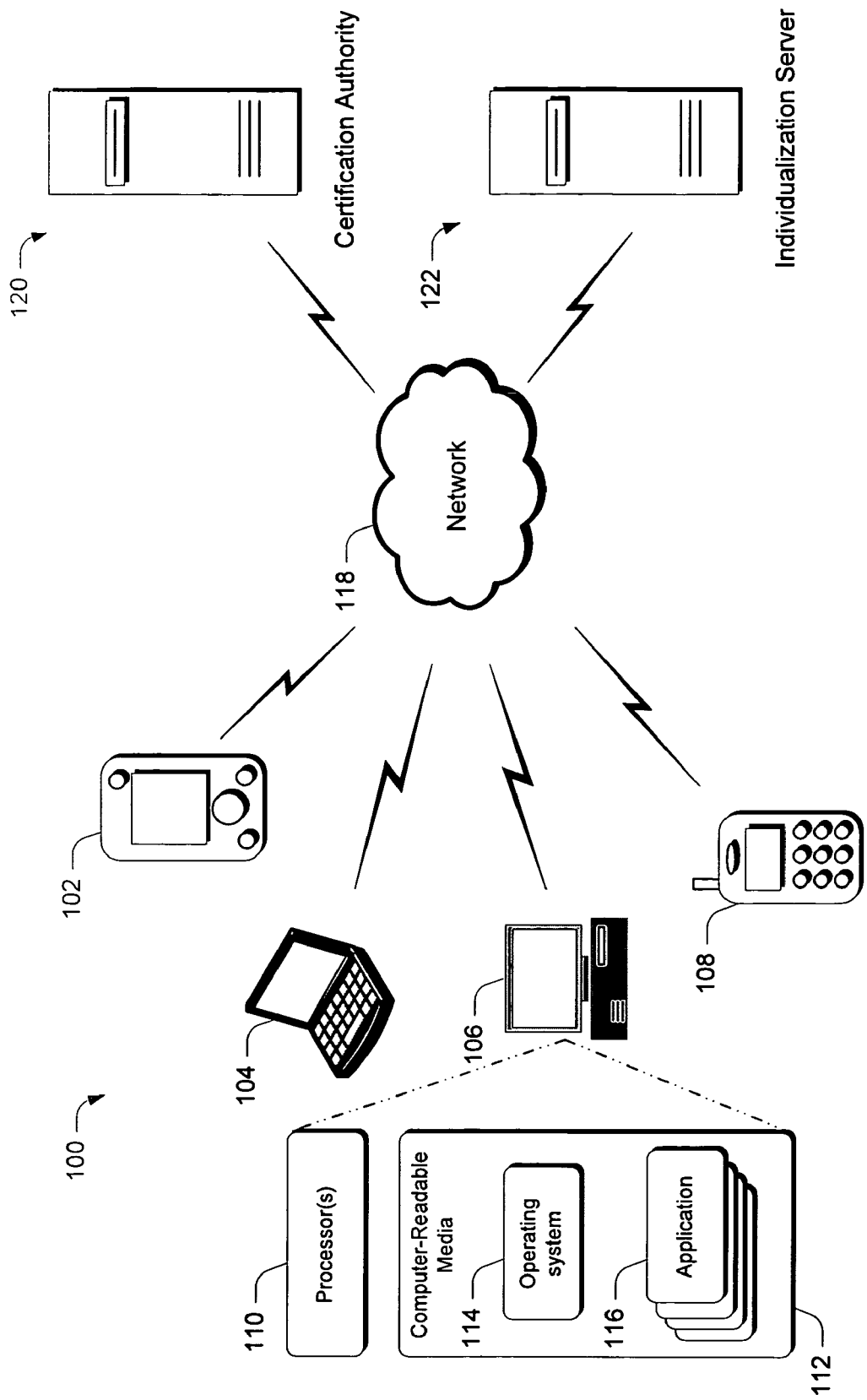
FIG. 1 illustrates an operating environment in accordance with one or more embodiments.

FIG. 1 illustrates an operating environment in accordance with one or more embodiments, generally at 100. Operating environment 100 includes multiple different computing devices, examples of which are shown at 102, 104, 106, and 108. The computing devices can be used by a user to request certificates as will become apparent below. Individual computing devices can typically include one or more processors 110, one or more computer-readable media 12, an operating system 114 and one or more applications 116 that reside on the computer-readable media and which are executable by the processor(s). Such applications can include, by way of example and not limitation, a media playing application or any other type of application that can enable distributed content to be consumed by a user.

The computer-readable media can include, by way of example and not limitation, all forms of volatile and non-volatile memory and/or storage media that are typically associated with a computing device. Such media can include ROM, RAM, flash memory, hard disk, removable media and the like.

In addition, in at least some embodiments, environment 100 includes a network 118, such as a local network or the Internet, via which certificates can be requested and sent.

Operating environment 100 also includes, in at least some embodiments, a Certification Authority 120 in the form of a server, and an individualization server 122.

Certification Authority 120 maintains a private key of a public/private key pair, which is protected and secure, and which is used to sign certificates that are issued by the Certification Authority. For example, in at least some embodiments, the Certification Authority can issue a certificate that includes first and second portions. The Certification Authority's private key can be used to sign the first portion of the certificate. The individualization server 122 can maintain a private key of a public/private key pair which is used to sign the second portion of the certificate issued by the Certification Authority, as will become apparent below. In one or more embodiments, the certificate's second portion can be used for including extended data that can be added to the certificate after it has been signed by the Certification Authority's private key. Any suitable data can be included in the extended data including, by way of example and not limitation, an ID associated with a user or a client device. In this way, two different keys can be utilized to assert information that is contained in the certificate.

The computing devices can be embodied as any suitable computing device such as, by way of example and not limitation, a desktop computer (such as computing device 106), a portable computer (such as computing device 104), a handheld computer such as a personal digital assistant (such as computing device 102), a cell phone (such as computing device 108), and the like. One example of a computing device is shown and described below in relation to FIG. 4.

Having discussed the general notion of an example operating environment in which various embodiments can operate, consider now a discussion of how different keys can be utilized to assert information in a digital certificate.

Using Different Keys to Assert Information in a Digital Certificate

Figure 2:
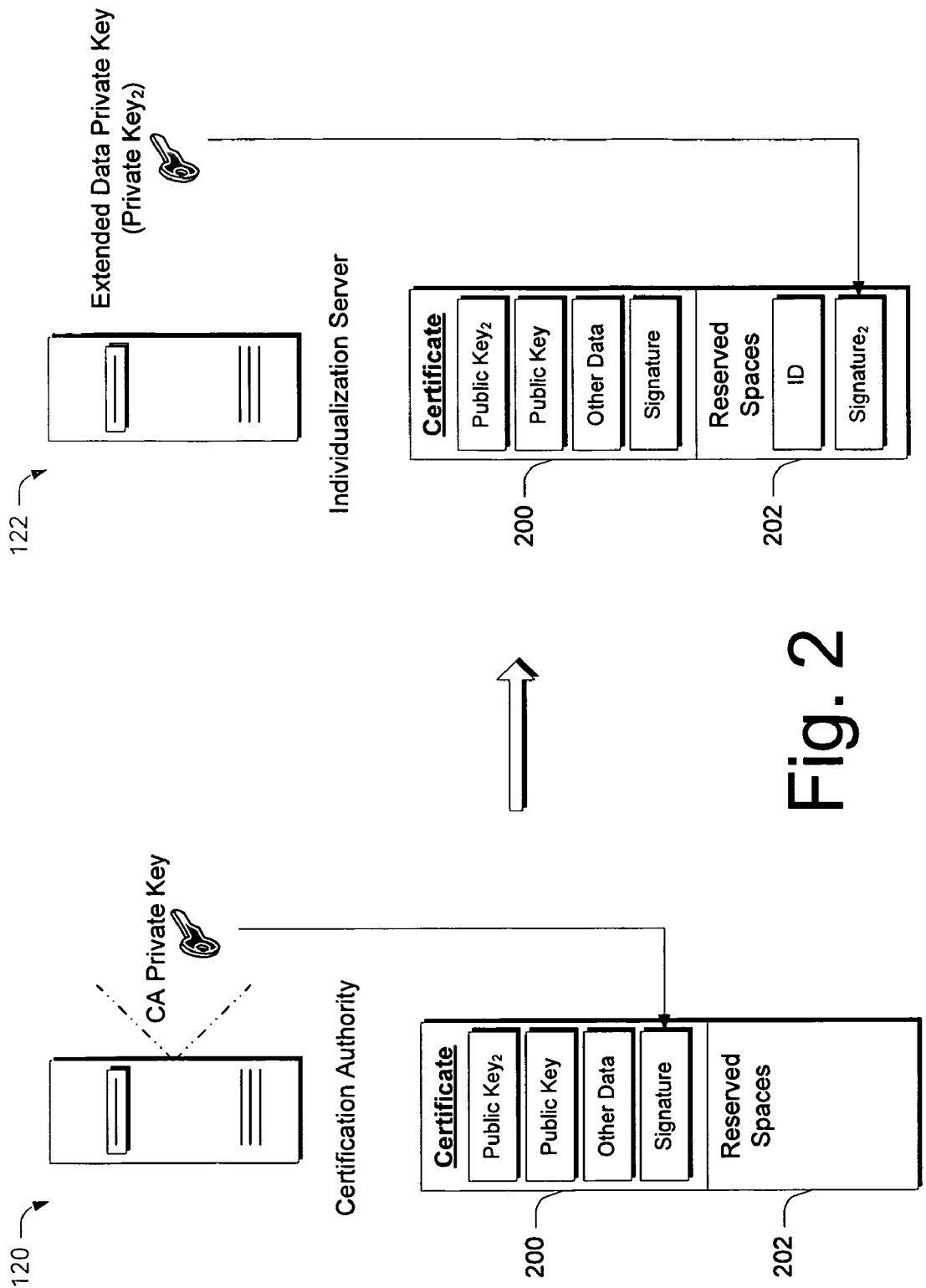
FIG. 2 illustrates a Certification Authority and an individualization server in accordance with one or more embodiments.

FIG. 2 illustrates Certification Authority 120 and individualization server 122 in accordance with one or more embodiments.

In the illustrated and described embodiment, the Certification Authority 120 maintains a secure private key, referred to in the figure as the "CA Private Key". The Certification Authority's private key is utilized to generate a certificate, also referred to herein as a data structure, as will be appreciated by the skilled artisan. In one or more embodiments, certificates generated by the Certification Authority can include a first portion 200 and a second portion 202. The first portion 200 can, in at least some embodiments, include a public key (designated "Public Key$_2$"), a public key associated with a client or user (designated "Public Key"), other data such as that mentioned above, and a signature, provided by the CA private key, over the certificate's first portion. In the illustrated and described embodiment, the Public Key$_2$ corresponds to the public key of an extended data signing key pair whose private key is maintained by individualization server 122 (designated "Private Key$_2$"). The second portion 202 can include reserved spaces that can be used for adding extended data to the certificate after the certificate has been signed by the CA private key. In the illustrated and described embodiment, second portion 202 is not signed by the CA private key, but is rather, as described below, signed by the private key corresponding to "Public Key$_2$" and hence is designated "Signature$_2$".

In at least some embodiments, the certificate is generated off line which can include scenarios in which a client device has not requested a certificate. That is, in at least some embodiments, the certificate is generated in advance of a client's request for a certificate. Once generated, the certificate can be provided to individualization server 122. The individualization server can maintain a collection of pre-generated certificates that have been signed by the CA private key.

The individualization server 122 can be used to add extended data to the certificate using second portion 202. The extended data can be added at any suitable time. For example, in at least some embodiments, the extended data can be added at run time and, in response to a request from a client device for a certificate. Any suitable type of extended data can be added to the certificate. In at least some embodiments, the extended data can include an ID, such as a hardware ID associated with the client device. Once the extended data has been added to the certificate, the second portion 202 can be signed using the private key (i.e., "Private Key$_2$") of the extended data signing key pair.

Having discussed an example Certification Authority and Individualization Server in accordance with one or more embodiments, consider now a discussion of an example method in accordance with one or more embodiments.

Example Method

Figure 3:
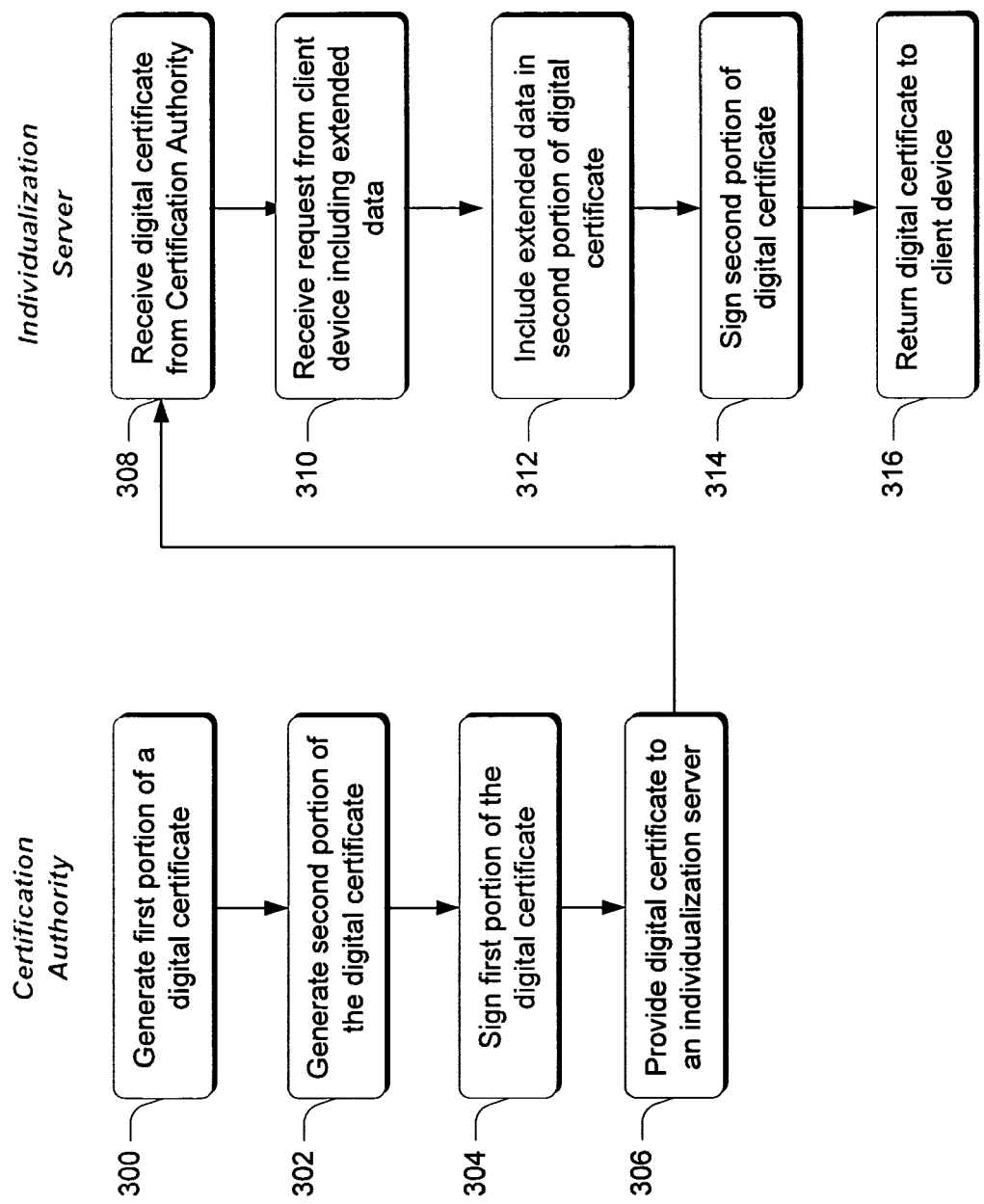
FIG. 3 is a flow diagram that describes steps in a method in accordance with one or more embodiments.

FIG. 3 is a flow diagram that describes steps in a method in accordance with one or more embodiments. The method can be implemented in connection with any suitable hardware, software, firmware, or combination thereof. In at least some embodiments, aspects of the method can be performed by a Certification Authority, and other aspects of the method can be performed by a suitably-configured server, such as an individualization server. As such, various acts are designated "Certification Authority" to indicate acts that are performed by a Certification Authority. Likewise, various other acts are designated "Individualization Server" to indicate acts that are performed by an individualization server. In at least some embodiments, the Certification Authority is a secure entity that resides in a physically-secure environment without Internet access. The Individualization Server, on the other hand, can be a front end server that is accessible via the Internet.

Step 300 generates a first portion of a digital certificate. The first portion can include a public key of an associated extended data signing key pair. The first portion can also include other types of information such as, by way of example and not limitation, a public key associated with a user or device, as well as other data that can typically be included in a certificate. Step 302 generates a second portion of the digital certificate. The second portion can include reserved spaces that are reserved for extended data that is to be provided after the first portion of the certificate is signed. Step 304 signs the first portion of the digital certificate. This step can be performed in any suitable way. For example, in at least some embodiments, the first portion of the digital certificate can be signed with a private key associated with the Certification Authority. Step 306 provides the digital certificate to a server such as an individualization server.

Step 308 receives the digital certificate from the Certification Authority. Step 310 receives a request from a client device including extended data. Any suitable type of extended data can be included in the request that is received from the client device. For example, in at least some embodiments, the extended data in the request can include an ID, such as a hardware ID associated with the client device. Step 312 includes the extended data in the second portion of the digital certificate. Step 314 signs the second portion of the digital certificate. This step can be performed in any suitable way. For example, in at least some embodiments, the individualization server can sign the second portion of the digital certificate using a private key of the extended data signing key pair. The private key of the extended data signing key pair is associated with and corresponds to the public key of the extended data signing key pair that was provided into the first portion of the digital certificate. Step 316 returns the digital certificate to the client device.

Accordingly, two different keys can be utilized to assert information in a digital certificate. Specifically, the Certification Authority's private key can assert first portions of the certificate, and the private key of the extended data signing key pair can be used to assert other information in an extended portion of the certificate. Thus, extended data can be added to a signed digital certificate without having a private key of a Certification Authority available. The digital certificate can be issued and signed off line by the Certification Authority, and then later extended data can be added and signed using the private key of the extended data signing key pair, whose corresponding public key was earlier embedded in the certificate.

Having discussed the notion of using different keys to assert information in a digital certificate, consider now a discussion of an example system that can be utilized to implement one or more embodiments.

Example System

Figure 4:
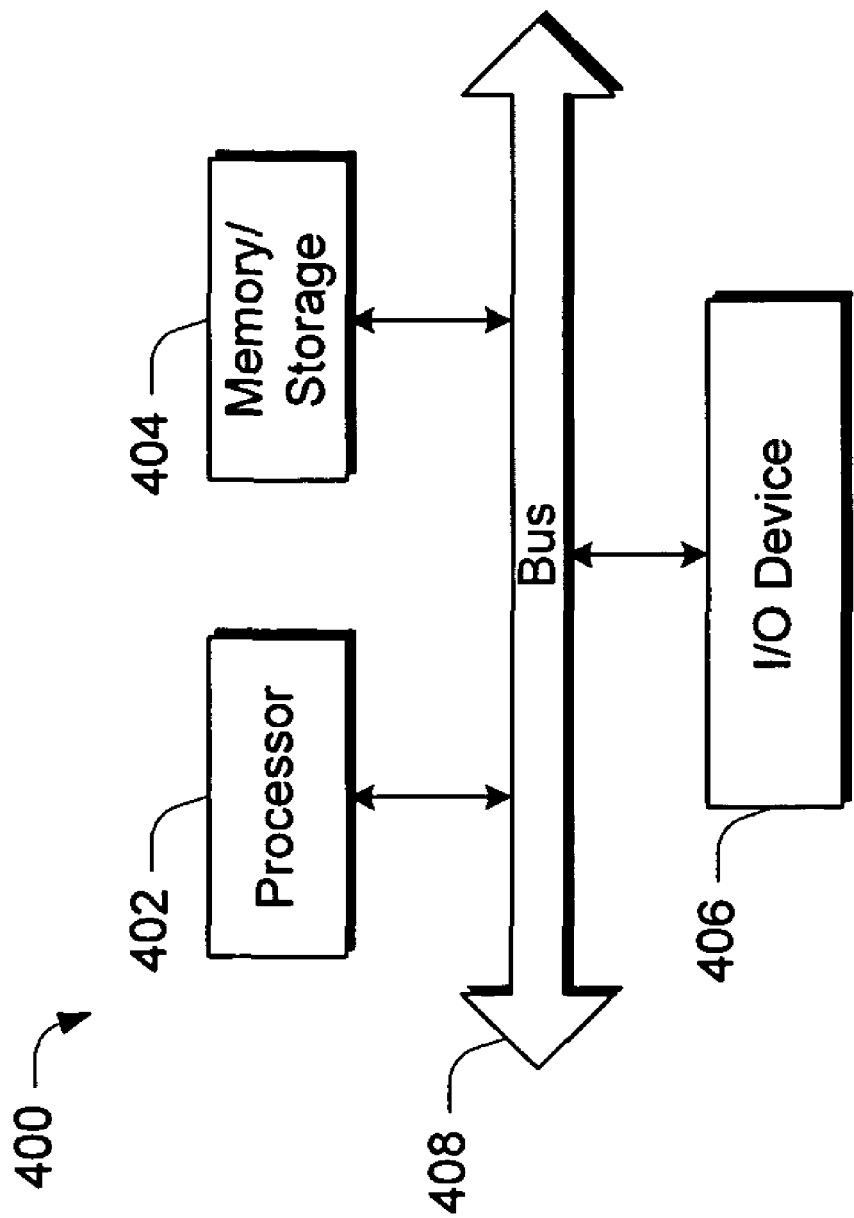
FIG. 4 is a block diagram of an example system that can be utilized to implement one or more embodiments.

FIG. 4 illustrates an example computing device 400 that can implement the various embodiments described above. Computing device 400 can be, for example, various computing devices or servers, such as those illustrated in FIG. 1 or any other suitable computing device.

Computing device 400 includes one or more processors or processing units 402, one or more memory and/or storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Component 404 can include volatile media (such as random access memory (RAM)) and/or non-volatile media (such as read only memory (ROM), Flash memory, optical disks, magnetic disks, and so forth). Component 404 can include fixed media (e.g., RAM, ROM, a fixed hard drive, etc.) as well as removable media (e.g., a Flash memory drive, a removable hard drive, an optical disk, and so forth).

One or more input/output devices 406 allow a user to enter commands and information to computing device 400, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments enable so-called extended data to be added to a signed digital certificate without having a private key of a Certification Authority available. In at least some embodiments, a digital certificate can be issued and signed off line by the Certification Authority, and then later extended data can be added and signed using another key, whose public key was earlier embedded and signed in the certificate.

In accordance with one or more embodiments, a certificate is generated off line and includes reserved spaces which can be added to the end of the certificate. The reserved spaces can be used for including extended data. The reserved spaces are not signed by a Certification Authority's private key. Rather, another key pair, referred to as an "extended data signing key pair", is generated for this purpose. The extended data signing key pair includes a public and a private key. The public key of the extended data signing key pair is embedded into the certificate when it is generated off line. During run time, a server such as an individualization server can add a client's ID to the reserved spaces of the certificate, and then sign the extended data with the corresponding private key of the extended data signing key pair. The extended data which, in at least some instances can include a client's ID, can be verified by the embedded extended data signing public key in the certificate.

In this manner, the certificate can be generated in two phases-a first phase can generate certificate portions prior to run time, and a second phase can generate other certificate portions at run time. The generated certificate can be cryptographically verified as with a normal digital certificate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    generating, by a certificate authority prior to run time, a first portion of a digital certificate;
    generating, by the certificate authority at run time, a second portion of the digital certificate, the second portion including reserved spaces that are reserved for extended data that is to be added after the first portion of the digital certificate is signed; and
    signing, by the certificate authority, the first portion of the digital certificate, the first and second portions defining a single digital certificate.

2. The method of claim 1, wherein said generating a first portion comprises including a public key of an associated extended data signing key pair.

3. The method of claim 1, wherein said signing is performed by signing the digital certificate using a private key associated with a Certification Authority.

4. The method of claim 1 further comprising providing the digital certificate to a server after the first portion has been signed.

5. The method of claim 1, wherein the reserved spaces can be reserved for inclusion of an ID associated with a client device.

6. The method of claim 1, wherein said second portion is unsigned, wherein said first portion includes a public key of an associated extended data signing key pair that is usable to verify the extended data that is to be provided into said second portion.

7. The method of claim 1, wherein said generating a first portion and said generating a second portion is not performed responsive to receiving a client request, wherein said second portion is unsigned.

8. The method of claim 1, wherein the reserved spaces can be reserved for inclusion of extended data associated with a run time request.

9. A computer-implemented method comprising:
    receiving, by a server, a single digital certificate from a Certification Authority, the single digital certificate including a signed first portion and an unsigned second portion, the unsigned second portion including reserved spaces that are reserved for extended data that is to be provided into the unsigned second portion;
    receiving, by the server and from a client device, a request that includes the extended data that is to be added to the single digital certificate;
    adding, by the server, the extended data to the unsigned second portion responsive to receiving the request, the extended data including a client ID associated with the client device; and
    signing, by the server, the unsigned second portion.

10. The method of claim 9, wherein the single digital certificate includes, in the signed first portion, a public key associated with a private key that is utilized to perform said signing.

11. The method of claim 9 further comprising returning the single digital certificate to the client device from which the request was received.

12. The method of claim 9, wherein said signing is performed without having a key used to sign the first portion available.

13. The method of claim 9 further comprising performing said adding and said signing responsive to receiving a run time request.

14. One or more computer-readable storage media embodying a data structure comprising at least a digital certificate defining a single digital certificate having a signed first portion and an unsigned second portion, the unsigned second portion including reserved spaces that are reserved for extended data that is to be provided into the unsigned second portion, the unsigned second portion configured to be signed by a private key of an entity that provides the extended data, the extended data including a client ID that is associated with a client device and which is to be provided into the unsigned second portion by the entity.

15. The one or more computer-readable storage media of claim 14, wherein the signed first portion includes a public key of an associated extended data signing key pair.

16. The one or more computer-readable storage media of claim 14, wherein the reserved spaces are reserved for including data associated with a run time request.

17. The one or more computer-readable storage media of claim 14, wherein the reserved spaces are reserved for including the client ID associated with the client device.

18. The one or more computer-readable storage media of claim 14, wherein the entity that provides the extended data into the unsigned second portion is different than an entity that generates the digital certificate.

19. The one or more computer-readable storage media of claim 14, wherein the digital certificate is generated by a certification authority located at a server, wherein the entity that provides the extended data into the unsigned second portion is located at an additional server, wherein the client ID is provided to the entity by the client device for provision into the unsigned second portion.

20. The one or more computer-readable storage media of claim 14, wherein the signed first portion of the digital certificate includes a public key of an associated extended data signing key pair, the public key being usable to verify the extended data that is to be provided into the unsigned second portion.

* * * * *